United States Patent
Risbood et al.

(10) Patent No.: US 9,063,818 B1
(45) Date of Patent: Jun. 23, 2015

(54) AUTOMATED SOFTWARE UPDATING BASED ON PRIOR ACTIVITY

(75) Inventors: Pankaj Risbood, Bangalore (IN); Parag Kacharulal Sarda, Bangalore (IN); Rahul S. Kulkarni, Maharashtra (IN); Rohit Jain, Bangalore (IN); Vittaldas Sachin Shenoy, Calicut (IN); Vivek Sahasranaman, Bangalore (IN)

(73) Assignee: Google Inc., Mountain View, CA (US)

( * ) Notice: Subject to any disclaimer, the term of this patent is extended or adjusted under 35 U.S.C. 154(b) by 406 days.

(21) Appl. No.: 13/153,971

(22) Filed: Jun. 6, 2011

Related U.S. Application Data (60) Provisional application No. 61/453,463, filed on Mar. 16, 2011.

(51) Int. Cl.
*G06F 9/445* (2006.01)
*G06F 9/44* (2006.01)

(52) U.S. Cl.
CPC .. *G06F 8/65* (2013.01); *G06F 8/61* (2013.01); *G06F 8/70* (2013.01)

(58) Field of Classification Search
CPC .............. G06F 9/445; G06F 8/71; G06F 8/61
USPC ............ 717/168.169, 170, 72, 173, 174, 175, 717/179
See application file for complete search history.

(56) References Cited

U.S. PATENT DOCUMENTS

| | | | |
|---|---|---|---|
| 5,463,768 A | 10/1995 | Cuddihy | |
| 5,655,081 A | 8/1997 | Bonnell | |
| 5,778,444 A | 7/1998 | Langan | |
| 5,794,224 A | 8/1998 | Yufik | |
| 6,148,368 A | 11/2000 | DeKoning | |
| 6,178,482 B1 | 1/2001 | Sollars | |
| 6,449,671 B1 | 9/2002 | Patkar | |
| 6,477,703 B1* | 11/2002 | Smith et al. | 717/168 |
| 6,505,211 B1 | 1/2003 | Dessloch | |
| 6,505,248 B1 | 1/2003 | Casper | |
| 6,587,866 B1 | 7/2003 | Modi | |
| 6,598,179 B1 | 7/2003 | Chirashnya | |
| 6,643,613 B2 | 11/2003 | McGee | |

(Continued)

FOREIGN PATENT DOCUMENTS

WO    WO2011095516 A1    8/2011

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Wei Zhen
*Assistant Examiner* — Brahim Bourzik
(74) *Attorney, Agent, or Firm* — Fish & Richardson P.C.

(57) ABSTRACT

Methods, systems, and apparatus, including computer programs encoded on a computer storage medium, for training a mathematical model to predict whether a future software update will be applied to one of the one or more computing devices using information collected from the devices, the collected information including the following for each of a plurality of software updates made available during the one or more time periods: an identification of software to which the update applies, whether the software update was installed on any of the computing devices, and, if so, whether the software installation was successful.

21 Claims, 5 Drawing Sheets

(56) References Cited

U.S. PATENT DOCUMENTS

| | | | |
|---|---|---|---|
| 6,829,678 B1 | 12/2004 | Sawdon | |
| 6,891,839 B2 | 5/2005 | Albert | |
| 6,898,697 B1 | 5/2005 | Gao | |
| 6,996,502 B2 | 2/2006 | De La Cruz | |
| 7,043,455 B1 | 5/2006 | Cuomo | |
| 7,062,718 B2 | 6/2006 | Kodosky | |
| 7,117,243 B2 | 10/2006 | Peart | |
| 7,466,703 B1 | 12/2008 | Arunachalam | |
| 7,478,388 B1 | 1/2009 | Chen | |
| 7,500,262 B1 | 3/2009 | Sanin | |
| 7,529,836 B1 | 5/2009 | Bolen | |
| 7,584,467 B2 * | 9/2009 | Wickham et al. | 717/171 |
| 7,596,620 B1 | 9/2009 | Colton | |
| 7,650,331 B1 | 1/2010 | Dean | |
| 7,653,833 B1 | 1/2010 | Miller | |
| 7,761,573 B2 | 7/2010 | Travostino | |
| 7,804,862 B1 | 9/2010 | Olson | |
| 7,836,285 B2 | 11/2010 | Giri | |
| 8,051,414 B2 * | 11/2011 | Stender et al. | 717/168 |
| 8,065,717 B2 | 11/2011 | Band | |
| 8,103,771 B2 | 1/2012 | Tanaka | |
| 8,108,903 B2 | 1/2012 | Norefors | |
| 8,146,147 B2 | 3/2012 | Litvin | |
| 8,261,295 B1 | 9/2012 | Risbood | |
| 8,276,140 B1 | 9/2012 | Beda | |
| 8,296,459 B1 | 10/2012 | Brandwine | |
| 8,407,687 B2 * | 3/2013 | Moshir et al. | 717/171 |
| 8,423,993 B2 * | 4/2013 | Faus et al. | 717/173 |
| 8,484,353 B1 | 7/2013 | Johnson | |
| 8,504,844 B2 | 8/2013 | Browning | |
| 8,533,796 B1 | 9/2013 | Shenoy | |
| 2002/0091902 A1 | 7/2002 | Hirofuji | |
| 2002/0097747 A1 | 7/2002 | Kirkby | |
| 2004/0139368 A1 | 7/2004 | Austen | |
| 2004/0148484 A1 | 7/2004 | Watanabe | |
| 2004/0210653 A1 * | 10/2004 | Kanoor et al. | 709/223 |
| 2005/0010715 A1 | 1/2005 | Davies | |
| 2005/0166011 A1 | 7/2005 | Burnett | |
| 2005/0196030 A1 | 9/2005 | Schofield | |
| 2005/0216659 A1 | 9/2005 | Ogawa | |
| 2005/0237543 A1 | 10/2005 | Kikuchi | |
| 2005/0257214 A1 * | 11/2005 | Moshir et al. | 717/171 |
| 2005/0289499 A1 | 12/2005 | Ogawa | |
| 2006/0026354 A1 | 2/2006 | Lesot | |
| 2006/0048077 A1 | 3/2006 | Boyles | |
| 2006/0048130 A1 * | 3/2006 | Napier et al. | 717/168 |
| 2006/0059228 A1 | 3/2006 | Kasamsetty | |
| 2006/0067236 A1 | 3/2006 | Gupta | |
| 2006/0075199 A1 | 4/2006 | Kallahalla | |
| 2006/0098618 A1 | 5/2006 | Bouffioux | |
| 2006/0136676 A1 | 6/2006 | Park | |
| 2006/0153099 A1 | 7/2006 | Feldman | |
| 2006/0161753 A1 | 7/2006 | Aschoff | |
| 2006/0271547 A1 | 11/2006 | Chen | |
| 2007/0011361 A1 | 1/2007 | Okada | |
| 2007/0112956 A1 | 5/2007 | Chapman | |
| 2007/0118694 A1 | 5/2007 | Watanabe | |
| 2007/0123276 A1 | 5/2007 | Parker | |
| 2007/0177198 A1 | 8/2007 | Miyata | |
| 2007/0199058 A1 | 8/2007 | Baumgart | |
| 2007/0271604 A1 | 11/2007 | Webster | |
| 2007/0280243 A1 | 12/2007 | Wray | |
| 2008/0028389 A1 * | 1/2008 | Genty et al. | 717/174 |
| 2008/0031324 A1 | 2/2008 | Hong | |
| 2008/0086515 A1 | 4/2008 | Bai | |
| 2008/0095176 A1 | 4/2008 | Ong | |
| 2008/0107112 A1 | 5/2008 | Kuo | |
| 2008/0205415 A1 | 8/2008 | Morales | |
| 2008/0208681 A1 | 8/2008 | Hammad | |
| 2008/0215796 A1 | 9/2008 | Lam | |
| 2008/0222246 A1 | 9/2008 | Ebling | |
| 2008/0222375 A1 | 9/2008 | Kotsovinos | |
| 2008/0244030 A1 | 10/2008 | Leitheiser | |
| 2008/0244471 A1 | 10/2008 | Killian | |
| 2008/0250407 A1 | 10/2008 | Dadhia | |
| 2008/0270704 A1 | 10/2008 | He | |
| 2008/0304516 A1 | 12/2008 | Feng | |
| 2008/0307258 A1 | 12/2008 | Challenger | |
| 2009/0097657 A1 | 4/2009 | Scheidt | |
| 2009/0150629 A1 | 6/2009 | Noguchi | |
| 2009/0199177 A1 | 8/2009 | Edwards | |
| 2009/0222815 A1 | 9/2009 | Dake | |
| 2009/0241108 A1 | 9/2009 | Edwards | |
| 2009/0249440 A1 | 10/2009 | Platt | |
| 2009/0276771 A1 | 11/2009 | Nickolov | |
| 2009/0300605 A1 | 12/2009 | Edwards | |
| 2009/0310554 A1 | 12/2009 | Sun | |
| 2010/0017859 A1 | 1/2010 | Kelly | |
| 2010/0023582 A1 | 1/2010 | Pedersen | |
| 2010/0046426 A1 | 2/2010 | Shenoy | |
| 2010/0057913 A1 | 3/2010 | DeHaan | |
| 2010/0071035 A1 | 3/2010 | Budko | |
| 2010/0088335 A1 | 4/2010 | Mimatsu | |
| 2010/0095000 A1 | 4/2010 | Kettler | |
| 2010/0199089 A1 | 8/2010 | Vysogorets | |
| 2010/0212004 A1 | 8/2010 | Fu | |
| 2010/0217927 A1 | 8/2010 | Song | |
| 2010/0235649 A1 | 9/2010 | Jeffries | |
| 2010/0274984 A1 | 10/2010 | Inomata | |
| 2010/0287548 A1 | 11/2010 | Zhou | |
| 2010/0293285 A1 | 11/2010 | Oishi | |
| 2010/0303241 A1 | 12/2010 | Breyel | |
| 2011/0010483 A1 | 1/2011 | Liljeberg | |
| 2011/0022812 A1 | 1/2011 | Van der Linden | |
| 2011/0055361 A1 | 3/2011 | Dehaan | |
| 2011/0078363 A1 | 3/2011 | Yeh | |
| 2011/0153838 A1 | 6/2011 | Belkine | |
| 2011/0191485 A1 | 8/2011 | Umbehocker | |
| 2011/0191768 A1 * | 8/2011 | Smith | 717/176 |
| 2011/0231280 A1 | 9/2011 | Farah | |
| 2011/0258441 A1 | 10/2011 | Ashok | |
| 2012/0060018 A1 | 3/2012 | Shinde | |
| 2012/0063458 A1 | 3/2012 | Klink | |
| 2012/0179796 A1 | 7/2012 | Nagaraj | |
| 2012/0185688 A1 | 7/2012 | Thornton | |
| 2012/0191912 A1 | 7/2012 | Kadatch | |
| 2012/0215050 A1 | 8/2012 | Hu | |
| 2012/0233678 A1 | 9/2012 | Pal | |
| 2012/0233705 A1 | 9/2012 | Boysen | |
| 2012/0240135 A1 | 9/2012 | Risbood | |
| 2012/0246637 A1 | 9/2012 | Kreeger | |
| 2012/0266159 A1 | 10/2012 | Risbood | |
| 2013/0081014 A1 | 3/2013 | Kadatch | |
| 2013/0227303 A1 | 8/2013 | Kadatch | |
| 2013/0262405 A1 | 10/2013 | Kadatch | |

OTHER PUBLICATIONS

Primet, Pascale, et al.., "HIPCAL: State of the Art of OS and Network virtualization solutions for Grids", Sep. 14, 2007, 38 pages.
Abdull, AlastairIrvine, et al. "Generic Routing Encapsulation", [online] [retrieved on Jan. 4, 2011]. Retrieved from the Internet: <URL: http:// creativecommons.org/licenses/by-sa/ 3. 0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 13 pages.
Bucket Explorer. "What is my AWS Access and Secret Key." [Retrieved Apr. 4, 2011]. Retrieved from the Internet <URL: http://www.bucketexplorer.com/documentation/amazon-s3-what-is-my-aws-access-and-secret-key.html>, 1 page.
Hongkiat. "Amazon S3—The Beginner's Guide." [Retrieved on Apr. 26, 2011]. Retrieved from the Internet <URL: http:// www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

(56) References Cited

OTHER PUBLICATIONS

Wikipedia. "OAuth." [online] [Retrieved on Jan. 20, 2011]. Retrieved from the Internet <URL: http://en.wikipedia.org/wiki/OAuth>, 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmcisdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Amazon Auto Scaling—Getting Started Guide—API Version Aug. 1, 2010. Amazon Web Services LLC, 2010, 20 pages.

Amazon Auto Scaling—Developer Guide—API Version Aug. 1, 2010. Amazon Web Services LLC, 2011, 62 pages.

Amazon CloudWatch—Developer Guide—API Version Aug. 1, 2010. Amazon Web Services LLC, 2010, 75 pages.

Benincosa. "Ganglia and Nagios, Part 2: Monitor enterprise clusters with Nagios-Install Nagios to effectively monitor a data center; make Ganglia and Nagios work together," 2009, 20 pages.

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

"IPsec". Creativecommons.org [online]. Creative Commons Attribution-Share Alike 3.0 Unported. [retrieved on Jan. 14, 2011]. Retrieved from the Internet:<URL: http://creativecommons.org/licenses/by-sa13.0/>, pp. 1-8.

"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/>, pp. 1-5.

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

Uploading Personal ssh Keys to Amazon EC2, Eric Hammond, Oct. 14, 2010. Retrieved from the Internet: <URL: http://alestic.com/2010/10/ec2-ssh-keys>, 3 pages.

Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

(56) References Cited

OTHER PUBLICATIONS

Anonymous, Storage I/O Control Technical Overview and Consideration for Deployment VMware vSphere™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christ of, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013, 11 pages.

Eng, Lili, Australian Government, IP Australia, Examiner's First Report for 2012200562, dated Jun. 4, 2012, 2 pages.

Wikipedia, "IPSec", [online] [retrieved on Jan. 4, 2011]. Retrieved from the Internet: <URL: http://en.wikipedia.org/wiki/IPsec/>, 8 pages.

* cited by examiner

AUTOMATED SOFTWARE UPDATING BASED ON PRIOR ACTIVITY

CROSS-REFERENCE TO RELATED APPLICATIONS

Under 35 U.S.C. §119, this application claims benefit of U.S. Provisional Application Ser. No. 61/453,463, filed Mar. 16, 2011, the entire contents of which are hereby incorporated by reference.

BACKGROUND

This specification relates to digital data processing, and particularly to an automated system for updating software.

An online website or an enterprise application may have hundreds of servers deployed to process data and serve webpages to users. Each server can have many software applications installed on it. For each of these software applications, there may be updates that are periodically sent out by the software publishers. Some updates are security fixes and are critical in nature. Some updates are optional but are needed to keep the software updated such that when a security patch needs to be applied, it is applied to the latest version of the software. Updates from some software publishers have a better track record of installing smoothly while updates from other software publishers can cause servers to malfunction. It can be a challenge for a user to determine which software updates to actually install and which to not install.

SUMMARY

In general, one innovative aspect of the subject matter described in this specification can be embodied in methods that include the actions of collecting information over one or more time periods regarding a software update history of a plurality of computing devices; training a mathematical model to predict whether a future software update will be applied to one of the one or more computing devices using the collected information, the collected information including the following for each of a plurality of software updates made available during the one or more time periods: an identification of software to which the update applies, whether the software update was installed on any of the computing devices, and, if so, whether the software installation was successful; receiving a prediction from the trained model that a new software update would be applied to a set of one or more of the computing devices; and responsive to the receiving, commanding the set of computing devices to install the new software update. Other embodiments of this aspect include corresponding systems, apparatus, and computer programs.

These and other aspects can optionally include one or more of the following features. Commanding the set of computing devices to install the software update, can further comprise: selecting a plurality of new software updates to install, the plurality of new software updates including the new software update and wherein at least one of the plurality of new software updates is not predicted to be installed according to the mathematical model; and commanding the set of computing devices to install the plurality of software updates in a prescribed order. A software update in the plurality of new software updates can have a higher order than other software updates in the prescribed order if the software update is predicted to be installed according to the mathematical model. Commanding the set of computing devices to install the software update, can further comprises: selecting a plurality of new software updates to install, the plurality of new software updates including the new software update; and commanding the set of computing devices to install the plurality of software updates in an order determined by one or more dependences among the plurality of new software updates. The dependencies can be learned based on user behavior regarding which software updates are installed by users before other software updates. The collected information can further include for each software update a version distance between the software update and currently installed software. The set of computing devices can include a plurality of computing devices which are located in one or more different geographic locations. The set of computing devices can include a plurality of computing devices and wherein commanding the set of computing devices to install the software update further comprises testing the new software update on one of the computing devices before installing the new software update on the other computing devices. The mathematical model can be trained based on an outcome of the testing.

Various implementations include a framework for (i) logging actions around software installation and usage in a network of computers; (ii) logging system administrator behavior when sent a notification for a software update; (iii) logging the installation of a software update/patch and ensuring system is functioning as before; (iv) taking into account all of these signals as training data, to create a mathematical model using machine learning; and (v) using the mathematical model to predict the probability of a software patch actually being installed by the administrator and using the prediction to decide whether or not to automatically install the software on the computer network. Further advantages include the ability to automatically test a software update before widely deploying it and the ability to specify or learn an order for multiple software updates to be installed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
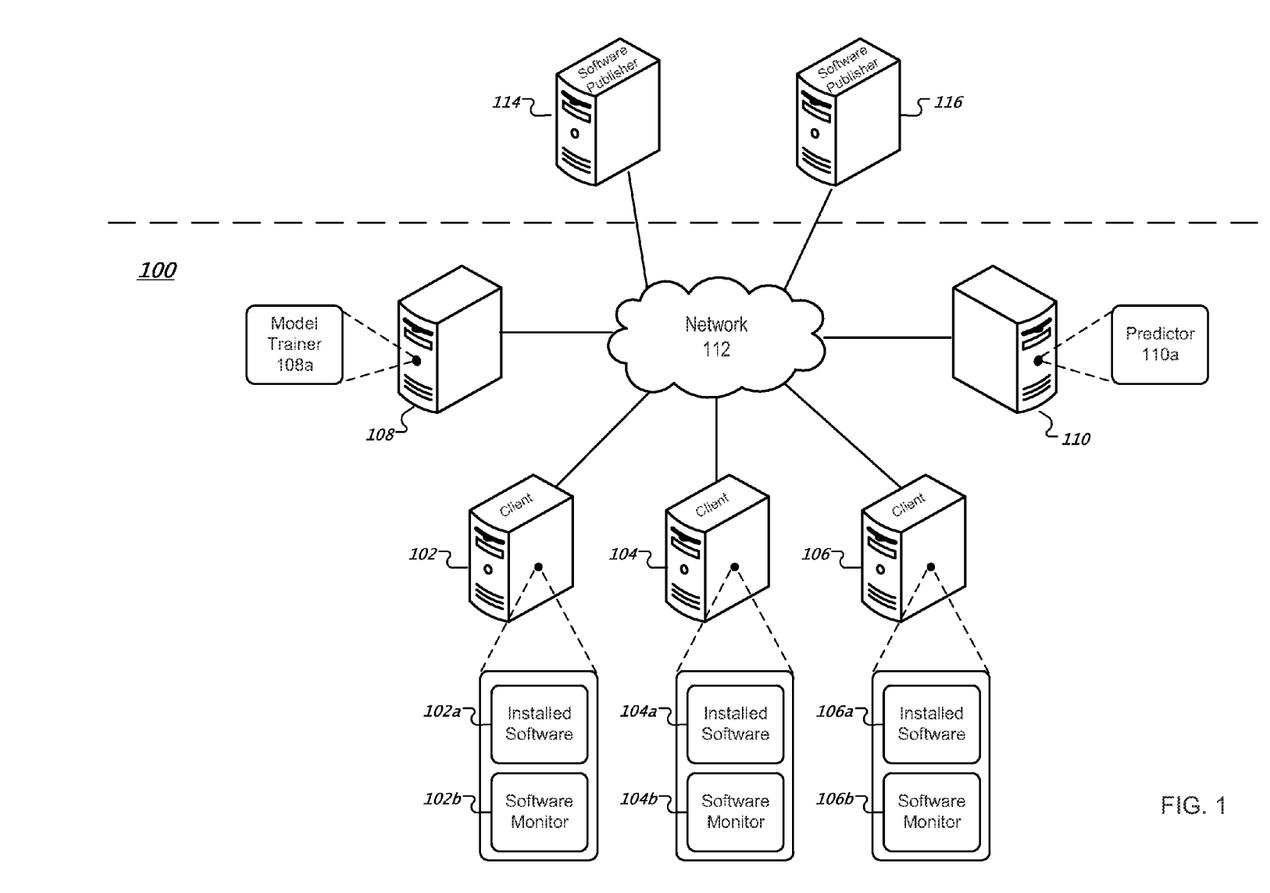
FIG. 1 is an illustration of an example software update system.

FIG. 1 is an illustration of an example software update system 100. The system 100 includes clients 102, 104 and 106 which are computing devices (e.g., data processing apparatus) such as servers, personal computers, laptop computers, smart phones, and tablet computers, for example, that are able to send and receive information over network 112 which is one or more networks such as the Internet. The clients can be in the same or in different geographical locations. Each client has installed software (102a, 104a, 106a) that represents software that is currently installed on the client. Software can be an executable program such as an operating system, a virtual machine, or an end-user application, or a combination of these, for instance. Software is not limited to executable programs and can include, for example, run-time libraries, data, and markup language documents. Other types of software are possible. Software can be written in programming languages such as C, C++, JAVASCRIPT, assembly language, and machine code, for example. Part of the installed software on each client is a software monitor (102b, 104b, and 106b) that executes on the client to monitor and collect system administrator or user behavior data pertaining to the installation of new software and updates to existing software. Software updates can be received from software publishers 114 and 116 through the network 112. A software publisher is an entity such as a software company or third party that distributes software updates electronically through servers on the network 112. A software update is a new version of a piece of software or a patch (e.g., a security patch or a bug fix) to an existing piece of software.

The information collected by the software monitors 102b, 104b, and 106b is sent at various times to a model trainer 108a software application which can execute on one or more computing devices 108. The model trainer 108a uses machine learning techniques to train a mathematical model to predict whether a given software update would be installed by a user on a given client based on past installation behavior for the client and other collected information. (Model training is discussed further below in reference to FIG. 2.) The mathematical model is implemented in predictor software 110a (or "predictor") which executes on one or more computing devices 110. The predictor 110a uses the trained mathematical model to predict whether a software update should be automatically installed on a given client and then commands the client to either install or ignore the software update based on the prediction. A command from the predictor 110a to a client (e.g., client 102) can be a command to install the update (e.g., embodied in a Transmission Control Protocol/Internet Protocol packet) sent through the network 112 to a software process executing on the client. In some implementations, the software process that receives and implements the command is the client's software monitor (e.g., software monitor 102b). In further implementations, the predictor 110a or the model trainer 108a, or both, execute on a client. In these implementations, the predictor 110a can command the client to install a software update by way of inter-process communication techniques such as message passing, synchronization, shared memory, and remote procedure calls, for example.

Figure 2:
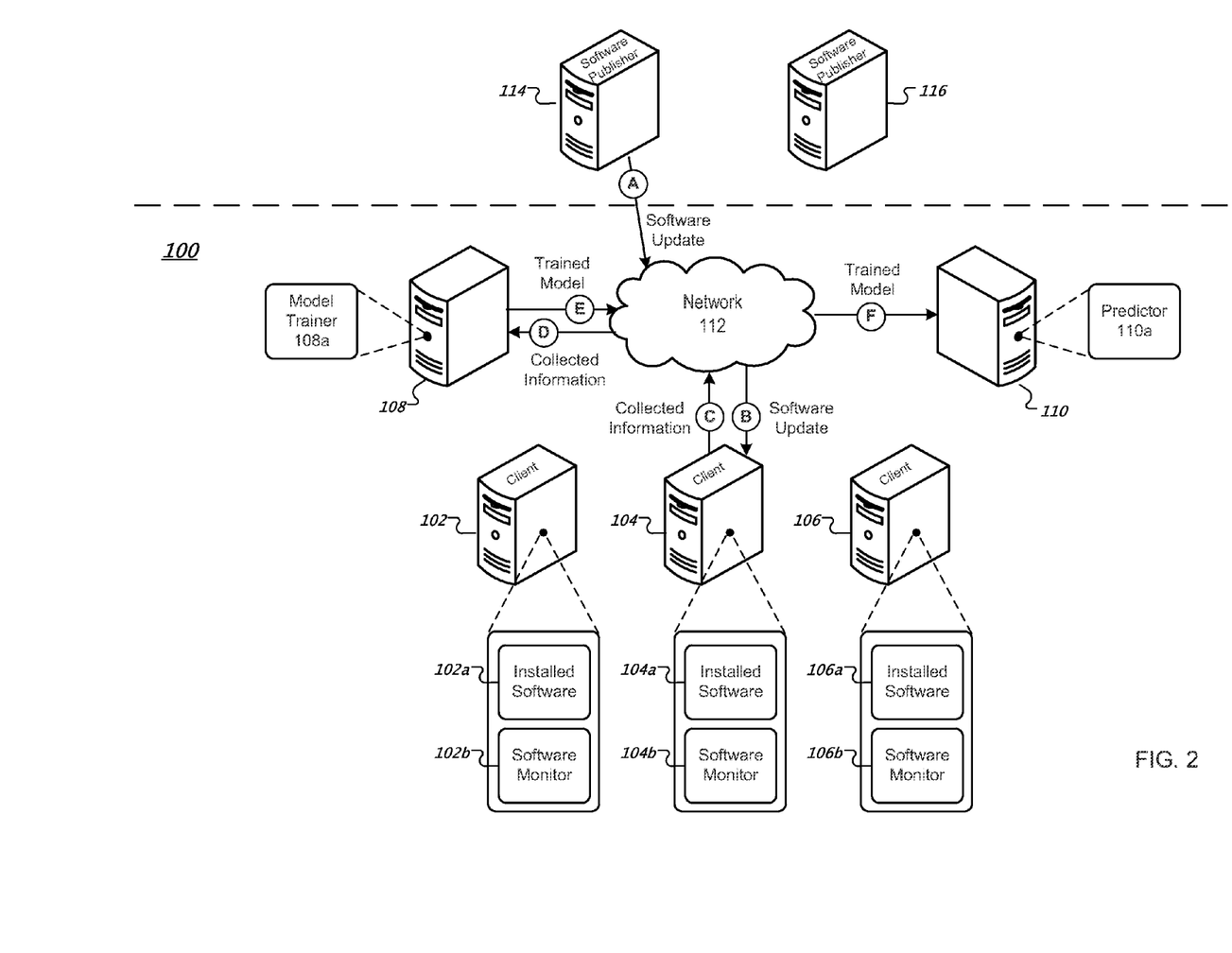
FIG. 2 is an illustration of model training in the system.

By way of illustration, FIG. 2 shows an example of model training in the system 100. Although this illustration is for a single client, the techniques described can be used to train a model using data collected from multiple clients. One or more communications labeled as "A" from software publisher 114 that contain a software update or an indication that a software update is available are transmitted to the client 104. Client 104 receives the software update in one or more communications labeled as "B" and a user such as a system administrator in charge of client 104 determines whether or not to install the software update. The software monitor 104b collects information regarding software updates that are made available to its client. For example, the software monitor 104b can detect when a system administrator or other user receives an electronic mail message, Short Message Service (SMS) message, or other communication announcing the availability of a software upgrade. Alternatively, the software monitor can check software publisher websites or systems at various times for notices of upgrades. Other ways of determining whether a software upgrade is available are possible. In some implementations, the information collected regarding software updates can include the information described in TABLE 1 below. Additional information can be collected, however.

TABLE 1

| INFORMATION | DESCRIPTION |
| --- | --- |
| Client Identifier | Identification of the client computing device such as an Internet Protocol address or other identifier. |
| Software Identifier | Identification of the software to which the update applies. |
| Update Version Identifier | The version of the software update. |
| Critical Update Flag | A Boolean value indicating whether the software publisher considers the update to be critical or not. |
| Installation Flag | A Boolean value indicating whether or not the software update was installed on the client referred to by the client identifier. |
| Success Flag | A Boolean value indicating whether or not the software update, if installed on the client referred to by the client identifier, was successful. |
| Previous Version Flag | Whether the client referred to by the client identifier has a previous version of the software installed. |
| Version Distance | If the client referred to by the client identifier has a previous version of the software installed, how many versions removed is the new software version from the current version. |

The software identifier comprises the software application product name, product code or combination of these, for which a software update applies. The update version identifier is text or a number that identifies the version of the software update (e.g., "Version 1.2a"). The software and update version identifiers can be extracted by the software monitor 104b using text parsing techniques, for example, from a message sent by a software publisher or other party to a system administrator or other user of a client 104. The software and update version identifiers can also be obtained by parsing text of a software publisher web page or through an application program interface (API) made available by the software publisher or other system. Other ways of obtaining the identifiers are possible.

The critical update flag is set to "true" if the software publisher has indicated that the update is critical, such as an update to address a security flaw or fix a severe error in the software. This information can be obtained in the same way as the software and update version identifiers, for instance.

The installation flag indicates whether or not the software update was installed on the client 104. In some implementations, the software monitor 104b determines whether a software update was installed within a time period (e.g., 48 hours) following a time when the software update became available to the client. For example, the software monitor 104b can check a software installation directory on the file system (e.g., installed software 104a) of the client to determine whether the software update was installed. The installation flag is set to "true" if the software update was installed within the time period, otherwise the installation flag is set to "false".

The success flag indicates whether or not an installed software update is functioning properly. In some implementations, the software update includes a test script (e.g., JAVASCRIPT) or a program that can be executed to determine whether the updated software is functioning properly. In further implementations, the software monitor 104b can determine whether updated software is functioning properly on the client 104 by monitoring usage of the updated software over time (e.g., 1-5 days) to detect crashes of the software or short usage times which are indicative of poorly functioning software. If the updated software is determined to be functioning properly, the success flag is set to "true". Otherwise, the success flag is set to "false".

Another piece of collected information is the version distance between the update version identifier and the version of the currently installed software (if any). In some implementations, a list of version identifiers for previously released software updates can be consulted to determine how many updates of the software were made available after a given version was installed on a client. If, for instance, there have been two software updates made available by a software publisher for given software since a version was last installed on the client 104, the version distance would be two. If there have been no intervening software updates to the software installed on the client 104 the version distance would be zero. Other ways of determining the version distance are possible.

The above collected information is sent in one or more communications labeled as "C" in FIG. 2 through network 112 or other means from the software monitor 104b to the model trainer 108a. The model trainer 108a receives the collected information in one or more communications labeled as "D" and a uses the information to train a mathematical model. The collected information in TABLE 1 can be aggregated over time to derive additional training information, as shown in TABLE 2. The additional information can be aggregated by the software monitor 104 and included in the communications to the model trainer 108a, or the model trainer 108a can aggregate the information received from various software monitors.

TABLE 2

| INFORMATION | DESCRIPTION |
| --- | --- |
| Past update behavior | Whether the client in the past has installed a software update in response to an update notice from a publisher. |
| Past update success (publisher) | How successful have past software updates from the software publisher been (regardless of the software application being updated) for the client? |
| Past update success (software) | How successful have past updates of the particular software been for the client? |
| Typical version distance | How many versions away does the client typically maintain software from current versions? |

The some or all of the collected information in TABLES 1 and 2 is used by the model trainer 108a to train a mathematical model to predict whether one or more clients would install a given software update. The mathematical model can be implemented using supervised or semi-supervised machine learning techniques, for example. Supervised learning generates a function that maps inputs (e.g., information in TABLES 1 and 2) to desired outputs (e.g., a prediction as to whether a future update to the software would be installed on the client). In some implementations, one or more support vector machines (SVMs) can be used to create the model from training data based on the collected information described above. Other types of machine learning approaches are possible such as, for example, decision tree learning, association rule learning, artificial neural networks, genetic programming, inductive logic programming, clustering, Bayesian networks, and reinforcement learning. Some training data can be weighted based on detected patterns in the collected information. By way of illustration, a training signal that a system administrator always installs updates from a certain software publisher may override the critical update flag. Once the model is trained, the model trainer 108a provides the model in one or more communications labeled as "E" in FIG. 2 through network 112 or other means to the predictor 110a which receives the trained model in one or more communications labeled as "F".

Figure 3:
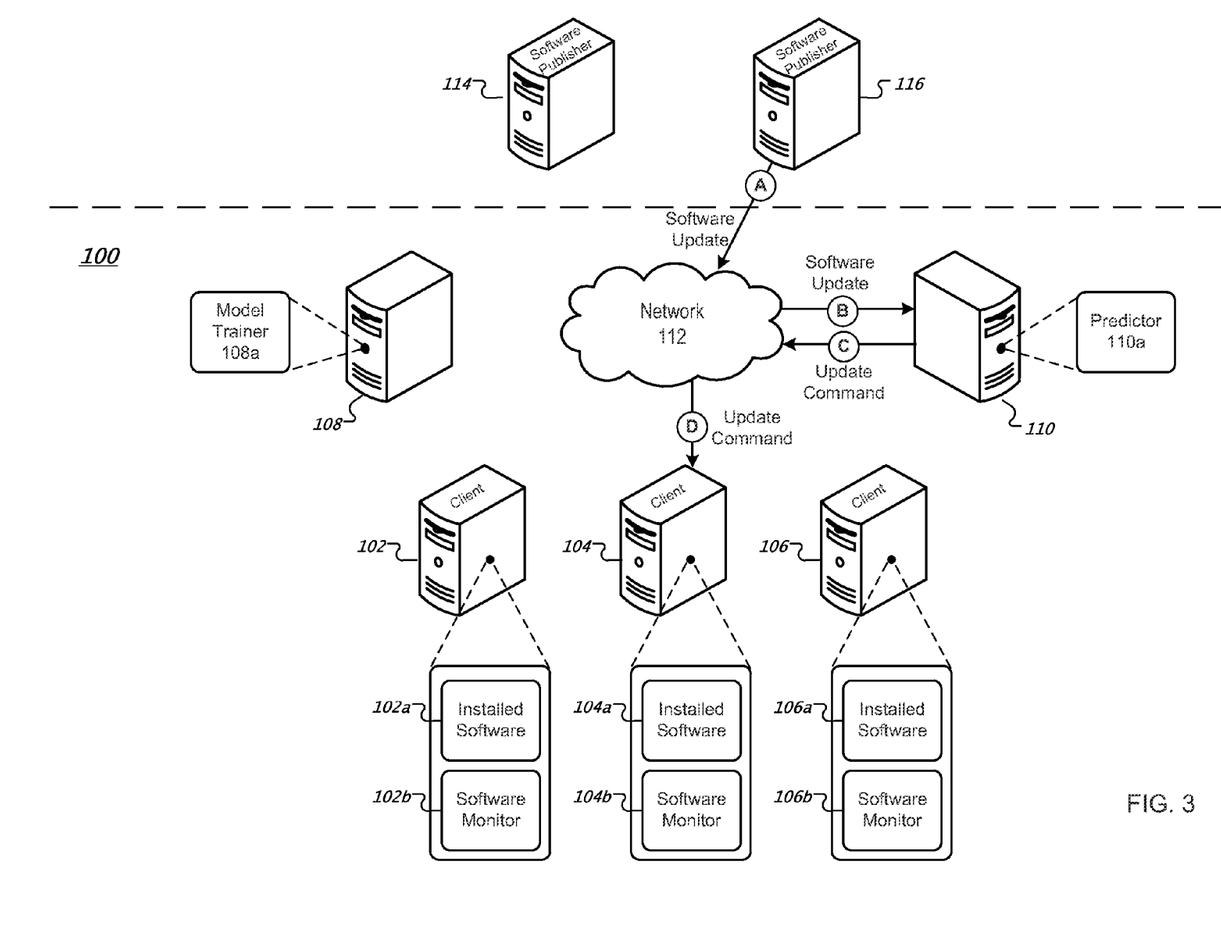
FIG. 3 is an illustration of example model usage in the system.

FIG. 3 is an illustration of example model usage in the system. One or more communications labeled as "A" from software publisher 116 that contain a software update or an indication that a software update is available are transmitted to, or intercepted by, the predictor 110a. The predictor 110a receives the software update in one or more communications labeled as "B". The predictor 110a provides some or all of the information listed in TABLES 1 and 2 for the software update as input to the trained mathematical model and the mathematical model outputs a prediction as to whether the client would install the software update. For example, if the trained model predicts that the client 104 would install the software update, the predictor 110 sends an update command labeled as "C" which is received as communication "D" by the client 104. In various implementations, the update command can instruct a process on the client 104 to either automatically install the software update or receive permission from a system administrator or other user before automatically installing the software update.

Figure 4:
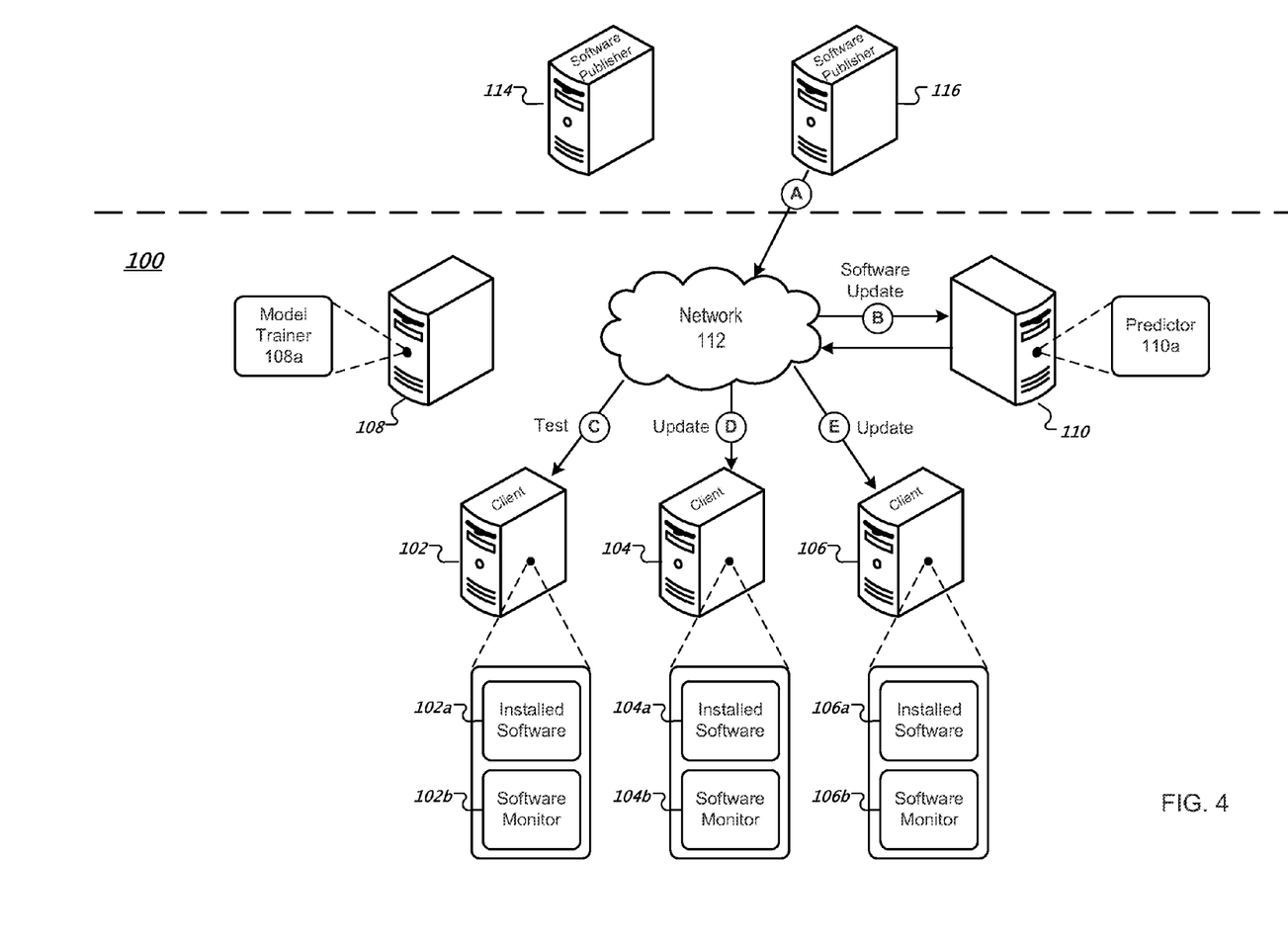
FIG. 4 is a further illustration of example model usage in the system.

In various implementations, the predictor 110a can use the mathematical model to determine if a software update applies to multiple clients (e.g., clients 102, 104 and 106) and, if so, send update commands to each of the clients that are predicted to install the update. Alternatively, when multiple clients (e.g., clients 102, 104 and 106) are predicted to install a software update, the predictor 110a can select a subset of the clients (e.g., client 102) to install the software update on first in order to test the update before deploying it to the other clients (e.g., clients 104 and 106). This is illustrated in FIG. 4. The predictor 110a sends a test command message labeled as "C" to a process executing on the client 102. The command message can contain the software and version identifiers of the software update and an indicate that the client is to install and test. The result of the test (success or failure) is sent from the client 102 to the predictor 110a. If the test succeeded, the predictor 110a instructs the other clients (clients 104 and 106) to install the update. The outcome of the testing can be used to further train the mathematical model (see, e.g., Success Flag in TABLE 1 above).

In further implementations, if the predictor 110a determines that there are multiple software updates to install for one or more clients, the predictor 110a can specify an order in which the software updates should be installed. In some implementations, the order is determined based on learned or specified dependencies among the software updates being installed. For example, it might be the case that an operating system software update is always performed before any other software updates. Likewise, a software application that uses other software during its execution might require updates to the other software to take place before it is updated. Update dependences can be specified manually be users or learned over time by, for example, the software monitor which can learn the order that a user installs software updates and include this in the collected information sent to the model trainer 108a.

Although FIGS. 2-4 illustrate clients 102, 104 and 106 "pushing" (i.e. sending) collected information to the model trainer 108a and the predictor 110a pushing update commands to the clients, in alternative embodiments the model trainer 108a can "pull" (i.e., request) the collected information from the clients at various times. Likewise, the clients can pull update commands (if any) from the predictor 110a at various times.

Figure 5:
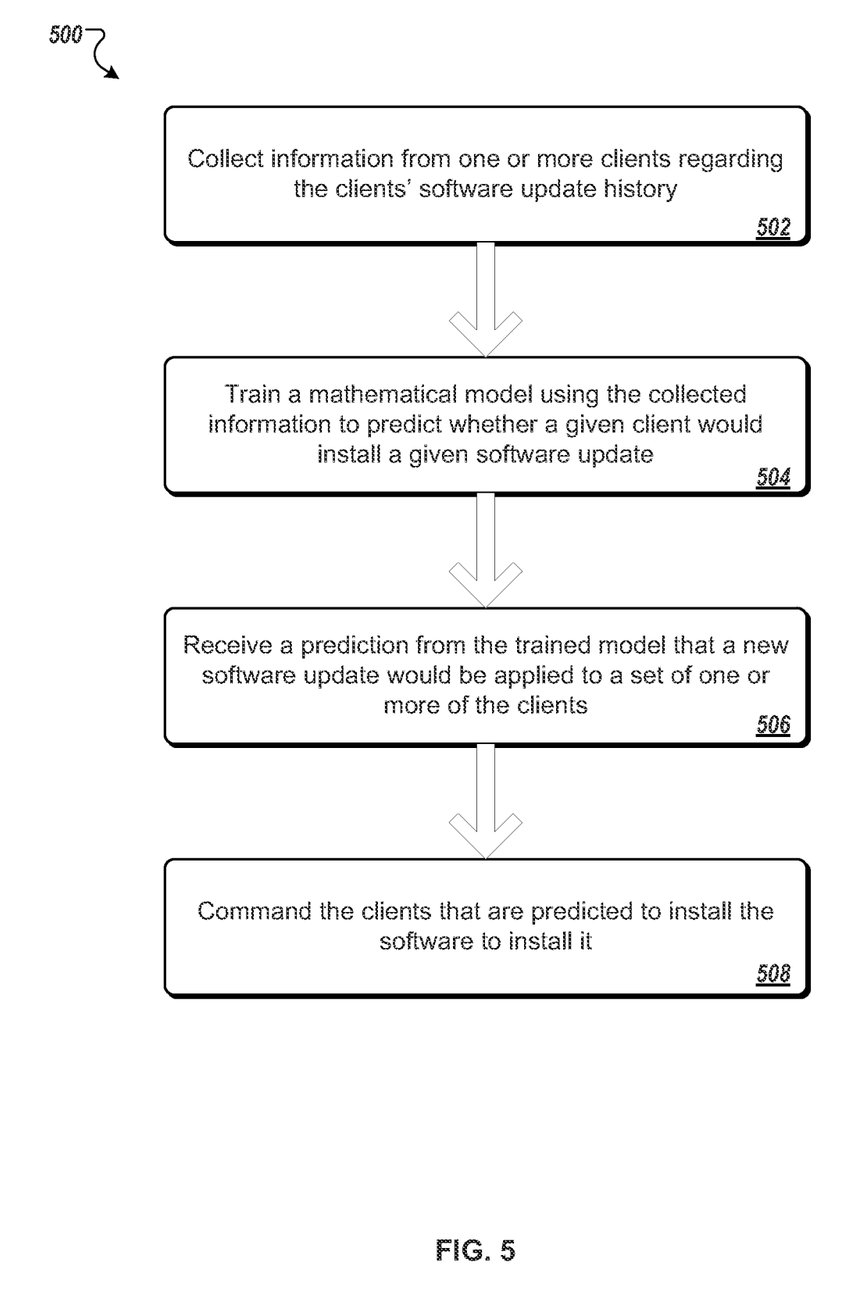
FIG. 5 is a flow chart of an example technique for predicting whether a client will install a software update.

FIG. 5 a flow chart of an example technique 500 for predicting whether a client will install a software update. Information is collected from one or more clients (e.g., clients 102, 104 and 106) regarding the clients' software update history (step 502). For example, some or all of the information in TABLES 1 and 2 can be collected at various times. The collected information is used by the model trainer 108a, for example, to train a mathematical model to predict whether a given client would install a given software update (step 504). A prediction is received from the trained model, e.g., by the predictor 110a, that a new software update would be installed on one or more of the clients (step 506). The identified clients are then commanded, e.g., by the predictor 110a, to install the software update (step 508). Alternatively, a subset of the clients can be used to test the software update before installing it on the other clients.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining, for a plurality of computing devices, software update history specifying, for each of a plurality of applications installed on the computing devices, i) an application identifier that specifies the application, ii) for each client and for each of a plurality of different application updates for the application, whether the application update was installed in response to an update notice; and iii) an application update history specifying, for each of the plurality of different application updates for the application that were previously installed on the plurality of computing devices, an indication of whether the application update was successfully installed;
   training, by machine learning and using i) the information specifying: for each client, whether the application update was installed in response to an update notice; and further specifying at least one application update was not installed in response to an update notice; and ii) the indications of whether the different application updates for each application were successfully installed, the indications including at least one successful indication and at least one unsuccessful indication, a mathematical model to predict whether an application update for a particular application of the plurality of applications will be applied to the particular application on one of the one or more computing devices, wherein the application update for which a prediction is to be provided is different from each of the different application updates included in the application update history for the particular application, and wherein:
      the mathematical model receives, as input, an application identifier that specifies an application specified by the application update; and
      the mathematical model provides, as output, a prediction that indicates whether the application update will be installed for the application specified by the application update, the prediction being based on the indications of whether the plurality of different application updates for the application specified by the application update were successfully installed;
   receiving a new update indication specifying a new application update that is available for the particular application, the new application update being different from each of the different application updates included in the application update history for the particular application, and being one of a plurality of new application updates to be installed in an order;
   providing an application identifier for the particular application to the mathematical model;
   receiving a prediction from the mathematical model that the new application update would be applied to the particular application on a set of the plurality of computing devices, and wherein the new application update is higher in the order than another new application update that is not predicted to be installed; and
   in response to receiving the prediction for the new application update, commanding the set of computing devices to install the new application update.

2. The method of claim 1 wherein commanding the set of computing devices to install the new application update, further comprises:

selecting a plurality of new application updates to install, the plurality of new application updates including the new application update; and commanding the set of computing devices to install the plurality of application updates in an order determined by one or more dependences among the plurality of new application updates.

3. The method of claim 2 wherein the dependencies are learned based on user behavior regarding which application updates are installed by users before other application updates.

4. The method of claim 1 wherein the application update history further specifies, for each application update, a version distance between the application update and currently installed software.

5. The method of claim 1 wherein the set of computing devices includes a plurality of computing devices which are located in two or more different geographic locations.

6. The method of claim 1 wherein commanding the set of computing devices to install the new application update further comprises testing the new application update on one of the computing devices before installing the new application update on the other computing devices.

7. The method of claim 6, further comprising further training the mathematical model based on an outcome of the testing.

8. A system comprising:
a non-transitory storage medium having instructions stored thereon; and
data processing apparatus operable to execute the instructions to perform operations comprising:
 obtaining, for a plurality of computing devices, software update history specifying, for each of a plurality of applications installed on the computing devices, i) an application identifier that specifies the application; ii) for each client and for each of a plurality of different application updates for the application, whether the application update was installed in response to an update notice; and iii) an application update history specifying, for each of a plurality of different application updates for the application that were previously installed on the plurality of computing devices, an indication of whether the application update was successfully installed;
 training, using i) the information specifying: for each client, whether the application update was installed in response to an update notice; and further specifying at least one application update was not installed in response to an update notice; and ii) the indications of whether the different application updates for each application were successfully installed, the indications including at least one successful indication and at least one unsuccessful indication, a mathematical model to predict whether an application update for a particular application of the plurality of applications will be applied to the particular application on one of the one or more computing devices, wherein the application update for which a prediction is to be provided is different from each of the different application updates included in the application update history for the particular application, and wherein:
  the mathematical model receives, as input, an application identifier that specifies an application specified by the application update; and
  the mathematical model provides, as output, a prediction that indicates whether the application update will be installed for the application specified by the application update, the prediction being based on the indications of whether the plurality of different application updates for the application specified by the application update were successfully installed;
 receiving a new update indication specifying a new application update that is available for the particular application, the new application update being different from each of the different application updates included in the application update history for the particular application, and being one of a plurality of new application updates to be installed in an order;
 providing an application identifier for the particular application to the mathematical model;
 receiving a prediction from the mathematical model that the new application update would be applied to the particular application on a set of the plurality of computing devices, and wherein the new application update is higher in the order than another new application update that is not predicted to be installed; and
 in response to receiving the prediction for the new application update, commanding the set of computing devices to install the new application update.

9. The system of claim 8 wherein commanding the set of computing devices to install the new application update, further comprises:
 selecting a plurality of new application updates to install, the plurality of new application updates including the new application update; and
 commanding the set of computing devices to install the plurality of application updates in an order determined by one or more dependences among the plurality of new application updates.

10. The system of claim 9 wherein the dependencies are learned based on user behavior regarding which application updates are installed by users before other application updates.

11. The system of claim 8 wherein the application update history further specifies, for each application update, a version distance between the application update and currently installed software.

12. The system of claim 8 wherein the set of computing devices includes a plurality of computing devices which are located in two or more different geographic locations.

13. The system of claim 8 wherein commanding the set of computing devices to install the new application update further comprises testing the new application update on one of the computing devices before installing the new application update on the other computing devices.

14. The system of claim 13, in which the operations further comprise training the mathematical model based on an outcome of the testing.

15. A non-transitory storage medium having instructions stored thereon which, when executed by data processing apparatus, cause the data processing apparatus to perform operations comprising:
 obtaining, for a plurality of computing devices, software update history specifying, for each of a plurality of applications installed on the computing devices, i) an application identifier that specifies the application; ii) for each client and for each of a plurality of different application updates for the application, whether the application update was installed in response to an update notice; and iii) an application update history specifying, for each of a plurality of different application updates for the application that were previously installed on the plurality of computing devices, an indication of whether the application update was successfully installed;

training, using i) the information specifying: for each client, whether the application update was installed in response to an update notice; and further specifying at least one application update was not installed in response to an update notice; and ii) the indications of whether the different application updates for each application were successfully installed, the indications including at least one successful indication and at least one unsuccessful indication, a mathematical model to predict whether an application update for a particular application of the plurality of applications will be applied to the particular application on one of the one or more computing devices, wherein the application update for which a prediction is to be provided is different from each of the different application updates included in the application update history for the particular application, and wherein:

the mathematical model receives, as input, an application identifier that specifies an application specified by the application update; and the mathematical model provides, as output, a prediction that indicates whether the application update will be installed for the application specified by the application update, the prediction being based on the indications of whether the plurality of different application updates for the application specified by the application update were successfully installed;

receiving a new update indication specifying a new application update that is available for the particular application, the new application update being different from each of the different application updates included in the application update history for the particular application, and being one of a plurality of new application updates to be installed in an order;

providing an application identifier for the particular application to the mathematical model;

receiving a prediction from the mathematical model that the new application update would be applied to the particular application on a set of the plurality of computing devices, and wherein the new application update is higher in the order than another new application update that is not predicted to be installed; and in response to receiving the prediction for the new application update, commanding the set of computing devices to install the new application update.

16. The storage medium of claim 15 wherein commanding the set of computing devices to install the new application update, further comprises:

selecting a plurality of new application updates to install, the plurality of new application updates including the new application update; and commanding the set of computing devices to install the plurality of application updates in an order determined by one or more dependences among the plurality of new application updates.

17. The storage medium of claim 16 wherein the dependencies are learned based on user behavior regarding which application updates are installed by users before other application updates.

18. The storage medium of claim 15 wherein the application update history further specifies, for each application update, a version distance between the application update and currently installed software.

19. The storage medium of claim 15 wherein the set of computing devices includes a plurality of computing devices which are located in two or more different geographic locations.

20. The storage medium of claim 15 wherein commanding the set of computing devices to install the new application update further comprises testing the new application update on one of the computing devices before installing the new application update on the other computing devices.

21. The storage medium of claim 20, in which the operations further comprise training the mathematical model based on an outcome of the testing.

\* \* \* \* \*